Nov. 2, 1954 R. C. SKAR 2,693,582
VARIABLE COUPLING DEVICE
Filed March 11, 1953 3 Sheets-Sheet 2

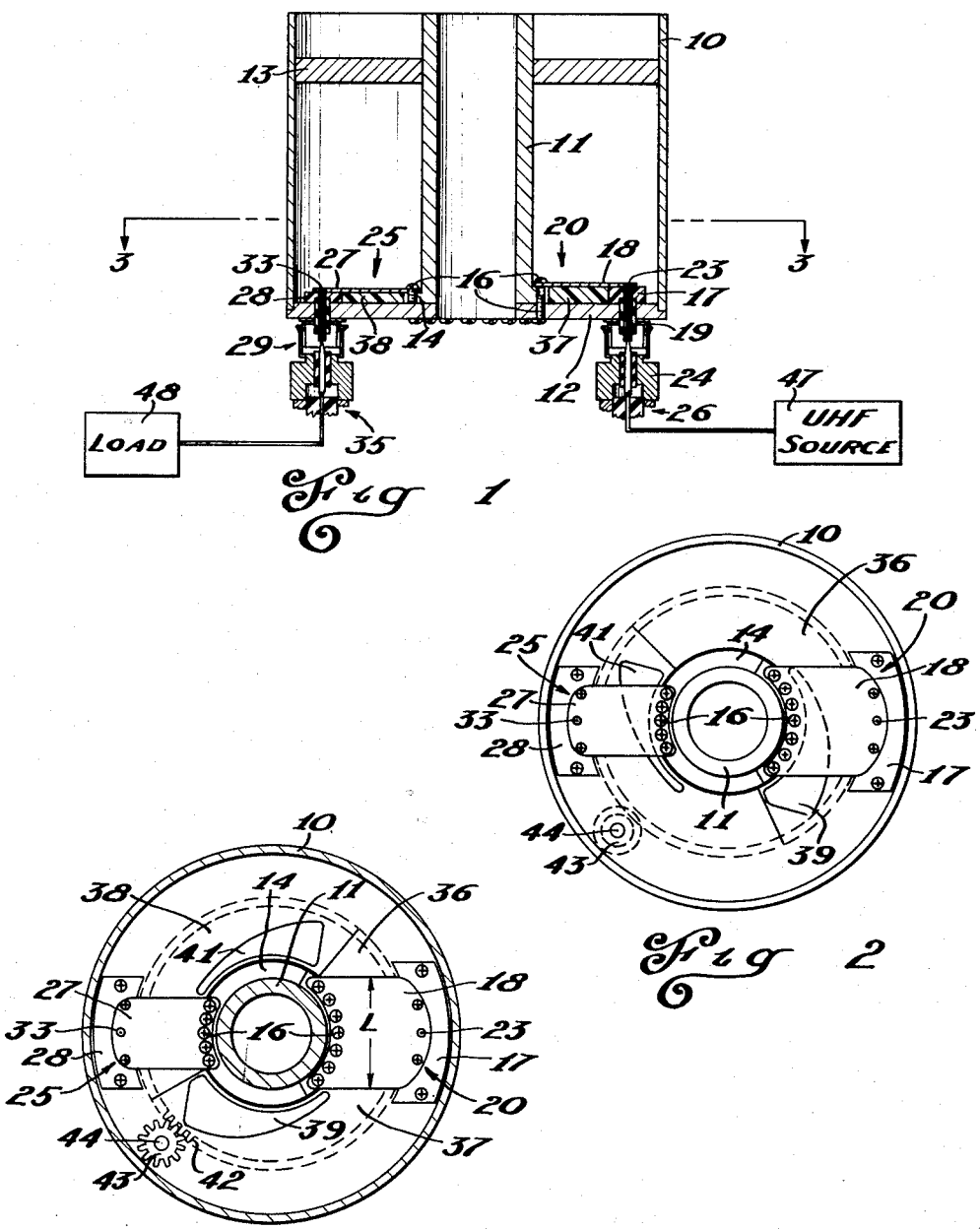

INVENTOR.
ROBERT C. SKAR
BY
ATTORNEY

Nov. 2, 1954     R. C. SKAR     2,693,582
VARIABLE COUPLING DEVICE

Filed March 11, 1953     3 Sheets-Sheet 3

INVENTOR.
ROBERT C. SKAR
BY
ATTORNEY

United States Patent Office 2,693,582
Patented Nov. 2, 1954

2,693,582

VARIABLE COUPLING DEVICE

Robert C. Skar, Cedar Rapids, Iowa, assignor to Collins Radio Company, Cedar Rapids, Iowa, a corporation of Iowa Application March 11, 1953, Serial No. 341,675

8 Claims. (Cl. 333—83)

This invention involves a variable coupling loop and more particularly, a coupling loop with means for controlling coupling flux and characteristic impedance.

A coupling loop is a short circuited termination of one transmission line inside another transmission or resonant system. It is a means of exchanging electromagnetic energy between the two systems. Oftentimes little attention is paid to the matching of the loop portion with the exterior portion of the line. It is therefore an object of this invention to provide a coupling loop whose characteristic impedance can be matched with the transmission line to which it is attached.

Often it is desirable to control the amount of coupling between a transmitting line and the receiving system. One means of accomplishing this is to control the amount of electromagnetic flux passing through the loop. It is therefore another object of this invention to provide a means for controlling the amount of electromagnetic flux coupling a loop.

Since resistance in a coupling loop causes coupling losses, it is still another object of this invention to provide a coupling loop with a low resistance.

Another object is to provide a coupling loop with great mechanical rigidity and which may be easily constructed.

It is another object of this invention to provide a coupling means for a cavity resonator which will maintain a constant Q over a wide frequency range.

It is another object of this invention to provide a coupling means which may be matched impedancewise.

A feature of this invention is a wide flat coupling loop with a dielectric supported conducting slug inserted a predetermined amount through the loop.

This invention, both as to its organization and operation, together with further objects, features and advantages, can best be understood by reference to the following specification and drawings, in which:

Figure 1 is a sectional view of a coupling loop and coaxial type cavity resonator;

Figure 2 is an inside end view of the coupling loops in Figure 4;

Figure 3 is a sectional view along line 3—3 of Figure 1;

Figure 4:
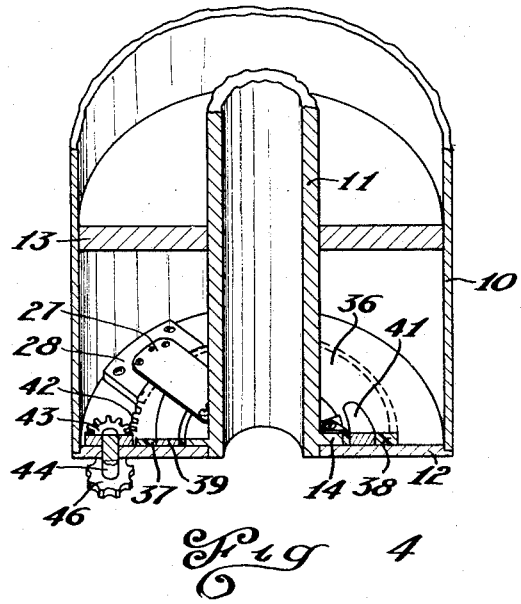
Figure 4 is a perspective partial sectional view of the cavity resonator shown in Figure 1.

Cavity resonators are frequency selective devices which require means for coupling ultra high frequency energy in and out of them. Figure 1 shows a coaxial type cavity resonator which has an outer conductor 10, an inner conductor 11, and an end plate 12. A tuning plunger 13 is longitudinally movable between outer conductor 10 and inner conductor 11 to change the resonant frequency of the cavity.

A metallic ring 14 extends radially from an end of inner conductor 11 and is fastened to end plate 12 by fastening means 16. An insulating support 17 is fastened to end plate 12 near outer conductor 10. The ends of a flat plate 18 are fastened to ring support 14 and insulating support 17. (Also see Figures 2 and 3.) Plate 18 is parallel to end plate 12 and forms a portion of a coupling loop.

Power is fed to loop plate 18 through an input transmission line 26 that terminates in a coaxial connector having a male portion 24. The male portion is receivable in a female connector 19 of a well known type. The outer conductor of the incoming line is grounded and the inner conductor 23 extends within the cavity resonator and connects to plate 18. Therefore, coupling loop 20 is a continuation of transmission line 26 to a short circuited termination within the cavity resonator.

An output loop 25 is similar to input loop 20 and has a loop plate 27 attached to annular ring 14 and an insulator support 28. A conductor 33 is connected to loop plate 27 by means of a conventional coaxial connector 29.

Figure 5:
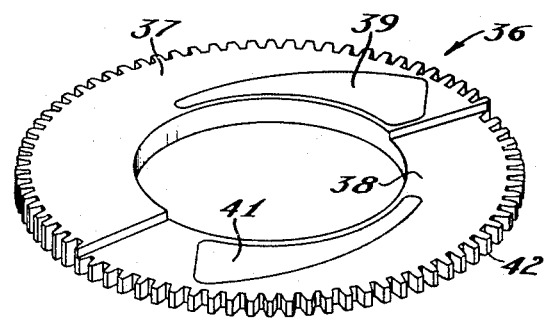
Figure 5 is a perspective view of the impedance and coupling varying disc.
Figure 6:
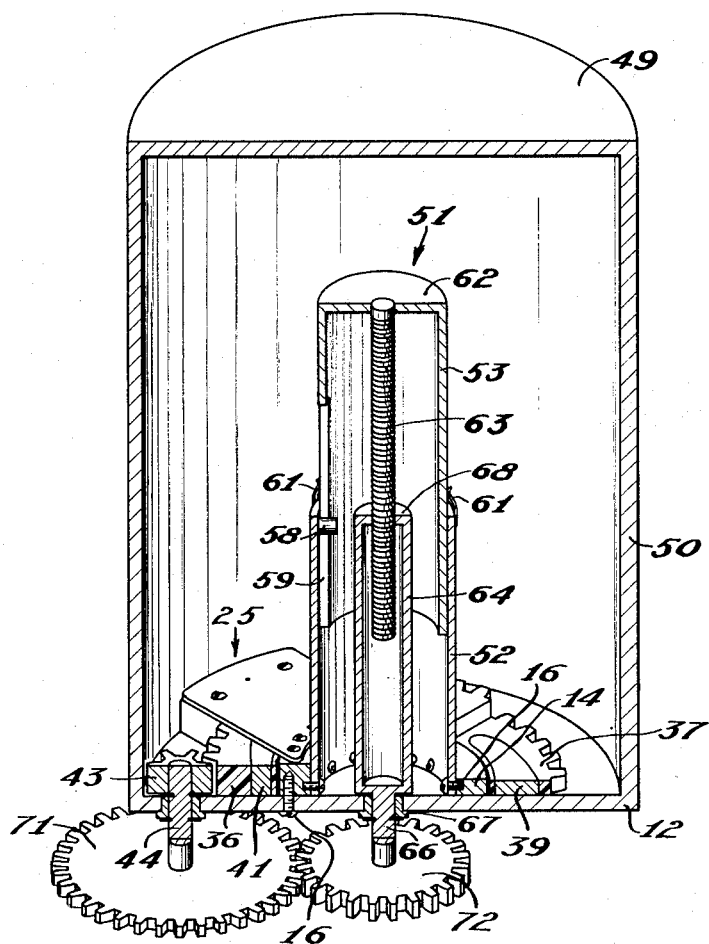
Figure 6 is a perspective view of a cavity resonator with variable coupling means which is mechanically controlled by the cavity tuning means.

A dielectric annulus 36 may be held between end plate 12 and loop plates 18 and 27. It will be noted in Figure 1 that loop plate 18 is spaced a greater distance from end plate 12 than loop plate 27. A thicker portion 37 of ring 36 is under loop plate 18 and a thinner portion 38 of ring 36 is under loop plate 27. The portions 37 and 38 substantially fill the entire gap between end plate 12 and loop plates 18 and 27, respectively. Thicker portion 37 supports a conducting slug 39 therein. The opposite sides of the slug are nearly flush with the faces of portion 37. Another slug 41 is imbedded in thinner portion 38 and its sides are nearly flush. Annulus 36 is shown in perspective in Figure 5. Its outside periphery has gear teeth 42 which are shown in Figure 4 to mate with a pinion 43 fixed to a shaft 44 that is rotatably supported by end plate 12. Another pinion 46 is fixed to the opposite end of shaft 44 and may be used to rotate annulus 36 either alone or in cooperation with a tuning plunger such as shown in Figure 6. Figures 2 and 3 show annulus 36 in two different positions which may be obtained by rotating pinion 46.

Figure 6 shows a cavity resonator similar to that shown in Figures 1 and 4, but with the addition of a mechanical coupling unit between the dielectric annulus and a tuning means provided for the cavity resonator. The cavity resonator of Figure 6 comprises an outside conductor 50 with end plates 49 and 12 and a tunable inner conductor 51 which is composed of a cylindrical fixed portion 52 and a cylindrical movable portion 53. The fixed portion 52 is attached by fastening means 54 to a metallic annular ring support 14 which is fixed to end plate 12 by other fastening means 16. The movable portion 53 slides longitudinally against the internal surface of fixed portion 52. A series of contacts 61 are annularly connected about an end of fixed portion 52 and slide against movable portion 53 to make portions 52 and 53 a single conducting body. A pin 58 is fixed radially from the internal surface of portion 52 and engages a longitudinal slot 59 in portion 53.

A disc 62 is fastened to an end of portion 53. A threaded shaft 63 is fixed to the center of disc 62 and extends concentric to movable portion 53.

Another shaft composed of a sleeve 64 and a solid extension 66 is rotatably supported by end plate 12 concentric to fixed portion 52. A bearing 67 is received on extension 66 which allows sleeve 64 to move rotationally but not longitudinally. Sleeve 64 has an internally threaded portion 68 which mates with the threads of shaft 63. It will be noted that rotational movement of sleeve 64 then causes longitudinal movement of shaft 63 and movable portion 53.

Input and output loops are the same in the apparatus of Figure 6 as those shown in Figures 1 and 4.

In operation, a source 47 of ultra high frequency energy will be connected to input transmission line 26 and a load 48 will be connected to output transmission line 35. The ultra high frequency source 47 will send waves of ultra high frequency voltage and current down the inner and outer conductors of the coaxial transmission line 26. The waves will travel from line 26 to loop plate 18 to a short circuited termination at ring support 14.

It is a well known physical principle that whenever a transmitted electrical wave strikes a medium of transmission dissimilar to the medium in which it was originally transmitted, reflections will occur.

It will be noted that the loop plate 18 is electrically a part of transmission line 26. Therefore incoming waves will see a geometrical transition in the line before they reach its short circuited termination. Unless special precautions are taken, the loop portion of the line will have a different characteristic impedance than the external portion, and energy reflection will be caused before the wave reaches the short circuited termination.

The present invention proposes a way to make the characteristic impedance for coupling loops equal to the characteristic impedance of their incoming line. That portion of the line which is input loop 20 has loop plate 18 parallel to end plate 12. The characteristic impedance of a transmission line made up of two parallel plates is explained by the equation:

$$(1) \quad Z_0 = \frac{377}{\sqrt{e}} \frac{W}{l}$$

in which $Z_0$ is the characteristic impedance, $e$ is the dielectric constant of the material between the two plates, $W$ is the distance between the opposite plates, and $l$ is the width of the plate as indicated in Figure 3.

Since the characteristic impedance is low for standard manufactured coaxial lines, a dielectric of air will often cause the plates 12 and 18 to be too close to allow coupling of the necessary energy. This problem is remedied here by inserting a suitable dielectric between the two plates. A sufficiently large gap, $W$, can then be obtained with the required characteristic impedance.

It will be noted in Figures 1 and 3 that the dielectric of portion 37 of annulus 36 fills the gap within input coupling loop 20 to provide a characteristic impedance which matches line 26. It will be observed that the characteristic impedance of a coupling loop can be changed to match almost any incoming line by changing the dielectric material within it and also by changing the width $l$.

As waves propagate down line 26 to the short circuited termination at ring 14, they will set up electromagnetic flux encircling loop plate 18. If the tuning plunger 13 is moved so that the cavity resonator is tuned to the source frequency, the electromagnetic flux oscillations about loop plate 18 will set up resonant oscillations in the cavity. The flux through loop plate 18 can be explained by the following equation:

$$(2) \quad \phi = \mu H S = \frac{V}{\omega}$$

where $\phi$ is the absolute value of flux about loop plate 18 caused by the incoming current waves, $V$ is the voltage across the input loop 20, $\omega$ is $2\pi$ times the frequency of the transmitted waves, $\mu$ is the permeability of the substance between the plates, $H$ is the unit field strength between the plates, and $S$ is the area perpendicular to the flux which in Figure 1 would be the area bounded by end plate 12, ring support 14, loop plate 18 and conductor 23.

Some of the resonating flux within the cavity will couple the outgoing loop which will induce a voltage according to the following equation:

$$(3) \quad V = \omega \mu H S$$

where $V$ is the voltage induced in the output loop, $\omega$ is $2\pi$ times the frequency of oscillation of the coupling flux, $\mu$ is the permeability of the medium within the output loop, $H$ is the unit field strength of the flux through the loop, and $S$ is the area perpendicular to the flux shown in Figure 1 as the area bounded by loop plate 27, ring support 14, and plate 12, and conductor 33.

The output loop 25 is electrically part of outgoing transmission line 35. It is therefore desirable to have the characteristic impedance of the output loop identical with the characteristic impedance of the output transmission line in order to prevent reflection. The characteristic impedance of output loop 25 is controlled in the same manner as that of input loop 20. The dielectric of annulus portion 38 is therefore chosen so that the characteristic impedance of the outgoing loop will be identical with that of line 35 and/or the width $l$ may be varied.

Annulus 36 contains slugs 39 and 41 which are made of a highly conductive low permeability metal such as copper. Figures 1 and 3 show a position of annulus 36 where no slug is beneath either loop plate. The dielectric is an insulator of permeability that might be one, and it does not interfere with the flux coupling properties of loops 20 or 25. However, as annulus 36 is rotated in a counter-clockwise direction in Figure 3, it will be observed that slugs 39 and 41 enter the gap within loops 20 and 25, respectively. The slugs form an alternating current short circuit between end plate 12 and their respective loop plates.

The effect of rotating annulus 36 is to change the position of the short circuited termination of the loops which decreases their dielectric gap available for flux coupling. The flux coupling area $S$ of each loop thereby becomes smaller and the amount of flux coupled by each loop decreases proportionally. In this manner the coupling of each loop can be predetermined by obtaining a desired shape for slugs 39 and 41 which can be determined by a person skilled in the art.

It will be noted that as a short circuiting slug is inserted within its respective loop, the remaining gap in the loop continues to be filled with dielectric and the characteristic impedance of the shortened loop will therefore remain unchanged.

The above described manner of controlling the coupling of a loop can be used to control certain characteristics of a tunable cavity resonator such as shown in Figure 6. The resonator in Figure 6 is tuned by adjusting the length of the inner conductor 51. It is to be understood that this invention is not to be limited to any specific type of tuning means used in a cavity resonator and that used in Figure 6 was merely chosen as an example. The electromagnetic operation of the coupling loops (one loop 25 is shown), annulus 36, and slugs 39 and 41 are the same as previously described in Figures 1 and 4.

The gears 43, 71 and 72 provide means for varying the resonant frequency while proportionally rotating slugs 39 and 41. By varying the shape of the slugs, almost any desired relationship between frequency and coupling can be obtained for a cavity resonator.

The variation of Q with frequency and the impedance transformation properties of the cavity can be controlled in a desired manner by predetermining the shape of slugs 39 and 41 and by choice of dielectric in annulus 36.

This device furnishes a loop of very low resistance at ultra high frequencies. Because of flux concentration under each loop plate, skin effect forces current to distribute itself over the plate. Therefore, as the width of the loop is increased, the resistance of the loop is proportionately decreased. Therefore, a wide loop such as is used in this invention will have a minimum of resistance loss at ultra high frequencies.

It is to be understood that the coupling loops here described by way of example are not limited to a cavity resonator, but may be used wherever coupling loops are adaptable, such as in waveguides, resnatrons, magnetrons, etc. Wherever used, the loop structure here described can be applied with its matched impedance and variable coupling properties.

While there has been described what is at present considered the preferred embodiment of the invention, it will be observed by those skilled in the art that various changes and modifications may be made therein without departing from the spirit of the invention.

I claim:

1. Means for controlling the coupling of a radio frequency coupling loop in a cavity resonator comprising, a conducting thin flat plate mounted in said cavity resonator and with one end connected thereto, a dielectric plate mounted between said conducting plate and a wall of said resonator and movable relative to said resonator, a conducting slug embedded in said dielectric plate and shaped so as to change the flux passing between said conducting plate and a wall of said resonator when said dielectric plate is moved, and a conductor insulated from the resonator and connected to the opposite end of the conducting plate.

2. A variable electromagnetic wave coupling means comprising a container of conducting material, a flat conducting plate mounted in said container and with one end attached thereto and positioned parallel to the direction of electromagnetic flux lines within said container, a conductor connected to the other end of said conducting plate, a metallic slug movable between said plate and said conductor for varying the electromagnetic coupling, and means for moving said metallic slug relative to said conducting plate to control the flux linkage.

3. Means for controlling the degree of coupling of an electromagnetic coupling loop comprising, a conducting container, the coupling loop comprising a conducting plate connected at one end to said container, a transmission line connected to the other end of the plate, a dielectric plate mounted within the container and movable between said loop and container, a metallic slug mounted in said dielectric plate and having a variable cross-sectional area along the extent thereof so the degree of coupling may be varied as it moved.

4. A coupling loop for a cavity resonator comprising, a flat conducting plate in said resonator and with one end connected thereto, an insulating support between said resonator and the other end of said flat plate, a conducting member passing through said insulating support and connected to the other end of said flat plate, a plate of dielectric material mounted between said resonator and said flat plate and movable relative to said flat plate, a metallic slug mounted in said dielectric plate with adjacent sides flush and shaped so as to vary the degree of coupling of the loop as it is moved.

5. A cavity resonator that has a Q which varies in a predetermined manner with frequency comprising, an incoming loop supported within said resonator, an outgoing loop supported within said resonator, a first dielectric material movable between said incoming loop and said resonator, a second dielectric material movable between said resonator and said outgoing loop, a first slug with a predetermined shape embedded in said first dielectric material, a second slug with a predetermined shape embedded in said second dielectric material, tuning means for said resonator, and mechanical coupling means between said tuning means and said first and second dielectric materials for moving said slugs in a predetermined relationship with said tuning means.

6. A cavity resonator with variable coupling means connected between a radio frequency source and a load comprising, a resonator with an outer conducting surface, an inner conducting surface, and an end plate connected to said inner surface and said outer surface, a tuning plunger movable longitudinally in said resonator, an incoming flat coupling loop in said resonator and mounted to said inner conductor, an incoming transmission line connecting said incoming loop to said radio frequency source, an outgoing flat coupling loop in said resonator mounted to said inner conductor, an outgoing transmission line connecting said outgoing loop to the load, an annular dielectric disc passing through both coupling loops and rotatably movable through said loops, a first conducting slug embedded in one portion of said dielectric disc and movable between said end plate and said incoming loop when said disc is rotated, a second conducting slug embedded in another portion of said dielectric disc and movable between said end plate and said outgoing loop when said disc is rotated, and means for rotating said dielectric disc.

7. Means for controlling the Q of a cavity resonator comprising, a flat incoming loop mounted in said resonator, a flat outgoing loop mounted in said resonator, a dielectric disc mounted between one end of said resonator and said incoming and outgoing loops, a first conducting slug embedded in said dielectric disc to vary the coupling gap of the incoming loop in a predetermined manner as it moves relative thereto, a second conducting slug embedded in said dielectric disc to vary the coupling gap of the outgoing loop in a predetermined manner as it moves relative thereto, tuning means mounted in said resonator, and mechanical coupling means connected to said tuning means and to said dielectric disc to move the first and second slugs in a predetermined manner so that the Q of the resonator will have a predetermined relationship with frequency.

8. A cavity resonator in which a constant Q may be maintained over a wide frequency range comprising, an outer conductor, a pair of end plates mounted at each end of said outer conductor, an inner conductor supported from one of said end plates, a movable portion of said inner conductor longitudinally movable to tune said resonator, an incoming loop mounted in said resonator with a flat portion parallel to said end plate, an outgoing loop mounted in said resonator with a flat portion parallel to said end plate, a metallic ring supported by said one end plate adjacent said inner conductor to support one end of each of said incoming and outgoing loops, a first insulating support attached to the other end of said incoming loop and said one end plate, a second insulating support attached to the other end of said outgoing loop and said one end plate, a first conductor attached to said incoming loop to couple energy into said resonator, a second conductor attached to said outgoing loop to remove energy from said resonator, a dielectric annulus with gear teeth around its periphery mounted between said one end plate and said loops and including a first dielectric portion which passes through the gap in said incoming loop and a second dielectric portion which passes through the gap in said outgoing loop, a first conducting slug embedded in said first dielectric portion, a second conducting slug embedded in said second dielectric portion, tuning means connected to the movable portion of said inner conductor, a first shaft rotatably mounted in said one end plate, a first gear mounted on the inner end of the first shaft and engageable with the gear teeth on the dielectric annulus, a second gear on the outer end of said first shaft, a second shaft rotatably mounted in the one end plate and connected to said tuning means, and a third gear mounted on said tuning shaft and engageable with the second gear to simultaneously tune the cavity resonator and vary the coupling between the loops.

References Cited in the file of this patent
UNITED STATES PATENTS

| Number | Name | Date |
|---|---|---|
| 2,286,428 | Mehler | June 16, 1942 |
| 2,388,049 | Goode | Oct. 30, 1945 |
| 2,593,095 | Brehm | Apr. 15, 1952 |
| 2,611,822 | Bliss | Sept. 23, 1952 |